United States Patent
Corrigan (10) Patent No.: US 6,178,402 B1
(45) Date of Patent: Jan. 23, 2001

(54) METHOD, APPARATUS AND SYSTEM FOR GENERATING ACOUSTIC PARAMETERS IN A TEXT-TO-SPEECH SYSTEM USING A NEURAL NETWORK

(75) Inventor: Gerald E. Corrigan, Chicago, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/301,711

(22) Filed: Apr. 29, 1999

(51) Int. Cl.[7] .................................................. G10L 13/00
(52) U.S. Cl. ........................ 704/259; 704/258; 704/260
(58) Field of Search ................................... 704/232, 257, 704/259, 260

(56) References Cited

U.S. PATENT DOCUMENTS

| | | |
|---|---|---|
| 3,632,887 | 1/1972 | Leipp . |
| 3,704,345 | 11/1972 | Coker et al. . |
| 5,041,983 | 8/1991 | Nakahara et al. . |
| 5,163,111 | 11/1992 | Bajhi et al. . |
| 5,230,037 | 7/1993 | Giustiniani . |
| 5,327,498 | 7/1994 | Hamon . |
| 5,463,713 | 10/1995 | Hasegawa . |
| 5,472,796 | 12/1995 | Iwata . |
| 5,610,812 | 3/1997 | Schabes et al. . |
| 5,627,942 | 5/1997 | Nightingale et al. . |
| 5,642,466 | 6/1997 | Narayan . |
| 5,652,828 | 7/1997 | Silverman . |
| 5,668,926 | 9/1997 | Karaali et al. . |
| 5,751,907 * | 5/1998 | Moebius et al. ..................... 704/258 |
| 5,884,267 * | 3/1999 | Goldenthal et al. .................. 704/276 |
| 5,890,117 * | 3/1999 | Silverman ............................ 704/260 |
| 5,913,194 * | 6/1999 | Karaali et al. ....................... 704/259 |
| 5,950,162 * | 9/1999 | Corrigan et al. ..................... 704/260 |
| 6,052,481 * | 4/2000 | Grajski et al. ....................... 382/187 |
| 6,052,662 * | 4/2000 | Hogden ............................... 704/256 |

FOREIGN PATENT DOCUMENTS

WO 89/02134   3/1989   (WO) .

OTHER PUBLICATIONS

Scorkilis et al., "Text Processing for Speech Synthesis Using Parallel Distributed Models", 1989 IEEE Proc, Apr. 9–12, 1989, pp. 765–769, vol. 2.

Tuerk et al., "The Development of Connectionist Multiple–Voice Text–To Speech System" Int'l Conf on Acoustics Speech & Signal Processing, May 14–17, 1991 pp. 749–752 vol. 2.

Weijters et al., "Speech Synthesis with Artificial Neural Networks", 1993 IEEE Int'l Conference on Neural Networks, San Francisco, CA, Mar. 28–Apr. 1, vol. 3, pp. 1264–1269.

* cited by examiner

Primary Examiner—David R. Hudspeth
Assistant Examiner—Abul K. Azad
(74) Attorney, Agent, or Firm—James E. Gauger (57) ABSTRACT

The present invention provides a method, device and system to generate acoustic parameters in a text-to-speech system utilizing a neural network to generate a representation of a trajectory in an acoustic parameter space across a phonetic segment.

27 Claims, 5 Drawing Sheets

METHOD, APPARATUS AND SYSTEM FOR GENERATING ACOUSTIC PARAMETERS IN A TEXT-TO-SPEECH SYSTEM USING A NEURAL NETWORK

FIELD OF THE INVENTION

The present invention relates to text-to-speech synthesis, and more particularly, to acoustic parameter generation in neural network based text-to-speech synthesis.

BACKGROUND

During a text-to-speech conversion process, a linguistic representation of text is typically converted into a series of acoustic parameter vectors. Typically, these parameters are then converted into parameters used by a vocoder in order to generate a final speech signal.

Neural networks have been used to compute each vector of acoustic parameters, representing many computations for each second of speech. This can be a significant portion of the computational time for neural network based text-to-speech conversion.

Accordingly, there is a need for a neural network system that reduces the computation requirements for converting a linguistic representation into an acoustic representation.

SUMMARY OF THE INVENTION

A method in accordance with the present invention generates a series of acoustic descriptions in a text-to-speech system based upon a linguistic description of text. The method includes the steps of generating an information vector for each segment description in the linguistic description, wherein the information vector includes a description of a sequence of segments surrounding a described segment, using a neural network to generate a representation of a trajectory of acoustic parameters, the trajectory being associated with the described segment. The method also includes the step of generating the series of descriptions by computing points on the trajectory at identified instants.

An apparatus in accordance with the present invention generates a series of acoustic descriptions in text-to-speech system based upon a linguistic description of text. The apparatus includes a linguistic information preprocessor to receive the linguistic description and to generate an information vector for each segment description in the linguistic description, wherein the information vector includes a description of a sequence of segments surrounding a described segment. The apparatus also includes a neural network, operably coupled to the linguistic information preprocessor, to generate a representation of a trajectory of acoustic parameters, with trajectory being associated with the described segment. The apparatus further includes a trajectory computation unit operably coupled to a neural network, to generate the series of descriptions by computing points on the trajectory at identified instants.

A text-to-speech synthesizer in accordance with the present invention generates a series of acoustic descriptions in a text-to-speech system based upon a linguistic description of text. The synthesizer includes a linguistic information preprocessor to receive the linguistic description and generates an information vector for each segment description in an linguistic description, wherein the information vector includes a description of a sequence of segments surrounding a described segment. The synthesizer also includes a neural network, operably coupled to the linguistic information preprocessor, to generate a representation of a trajectory in a space for acoustic parameters with the trajectory being associated with the described segment. The synthesizer includes a trajectory computation unit, operably coupled to the neural network, to generate the series of descriptions by computing points on the trajectory at identified instants.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

The present invention relates to generating a description of a trajectory of acoustic parameters in order to represent a sequence of acoustic descriptions generated in a text-to-speech system, thereby providing a neural network text-to-speech system with reduced computation requirements.

The process of converting text to speech is generally broken down into two major blocks: text analysis and speech synthesis. Text analysis is the process by which text is converted into a linguistic description that can be synthesized. This linguistic description generally consists of the pronunciation of the speech to be synthesized along with other properties that determine the prosody of the speech. These other properties can include (1) syllable, word, phrase, and clause boundaries; (2) syllable stress; (3) part-of-speech information; and (4) explicit representations of prosody such as are provided by the ToBI labeling system, as known in the art, and further described in "ICSLP92 proceeding: IOBI: a standard for labeling English prosody" Silverman et al (1992).

The pronunciation of speech included in the linguistic description is described as a sequence of phonetic units. These phonetic units are generally phones, which are particular physical speech sounds, or allophones, which are particular ways in which a phoneme may be expressed. (A phoneme is a speech sound perceived by the speakers of a language). For example, the English phoneme /t/ may be expressed as a closure followed by a burst, as a glottal stop, or as a flap. Each of these represent different allophones of /t/. Different sounds that may be produced when /t/ is expressed as a flap represent different phones. Other phonetic units that are sometimes used are demisyllables and diphones. Demisyllables are half-syllables and diphones are sequences of two phones.

The portion of an utterance representing a particular occurrence of a phonetic unit is called a segment or a phonetic segment. Most commonly, the term segment is associated with a phone or phoneme, but it is used below to represent the portion associated with any phonetic unit. A phonetic segment type (or segment type) refers to the phonetic unit associated with a particular phonetic segment. A segment description is a data structure including the segment type for a particular segment along with any of the other properties mentioned above that may apply to the segment.

Figure 1A:
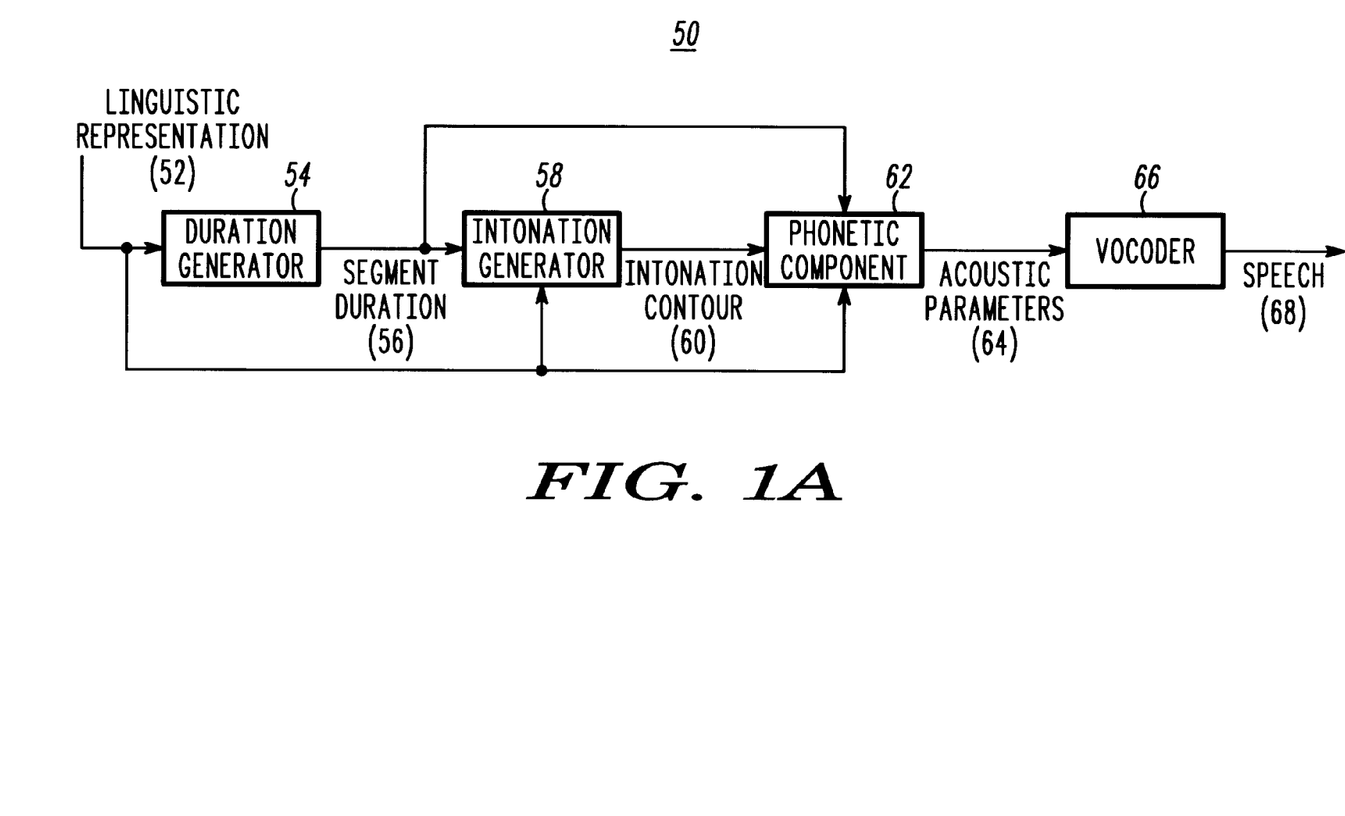
FIG. 1a is a block diagram illustrating a typical rule based or concentration speech synthesis component.

The process of converting the linguistic representation to speech may be further broken down. FIG. 1a illustrates a typical rulebased or concatenation speech synthesis component 50. The component 50 accepts a linguistic representation 52 as input. A duration generator 54 determines the duration of each segment described in the linguistic representation 52. An intonation generator 58 computes an intonation contour 60 for the entire utterance, based on the linguistic representation 52 and the segment durations 56. A phonetic component 62 determines acoustic parameters 64 for each frame of an utterance. These acoustic parameters 64 are provided to a vocoder 66 to generate speech 68. In a rule-based system, the phonetic component 62 has a target for each acoustic parameter for each segment type, typically a phone or phoneme, and has rules for smoothing the parameter transitions between the segments. In a typical concatenation system, the phonetic component has a parametric representation of a recording of a segment occurring in natural speech and concatenates these recorded segments, smoothing the boundaries between the segments. For a concatenation system, the segment types are typically diphones or demisyllables.

Neural network systems that are known in the art typically replace the phonetic component 62 and optionally the intonation generator 58 with a single neural network. Other systems known in the art replace the duration generator with a second neural network. The present invention can replace the phonetic component 62 and optionally the intonation generator 58 and the duration component 54 with a single neural network, and can perform better for a given computational complexity than the neural network systems that are known in the art.

Figure 1B:
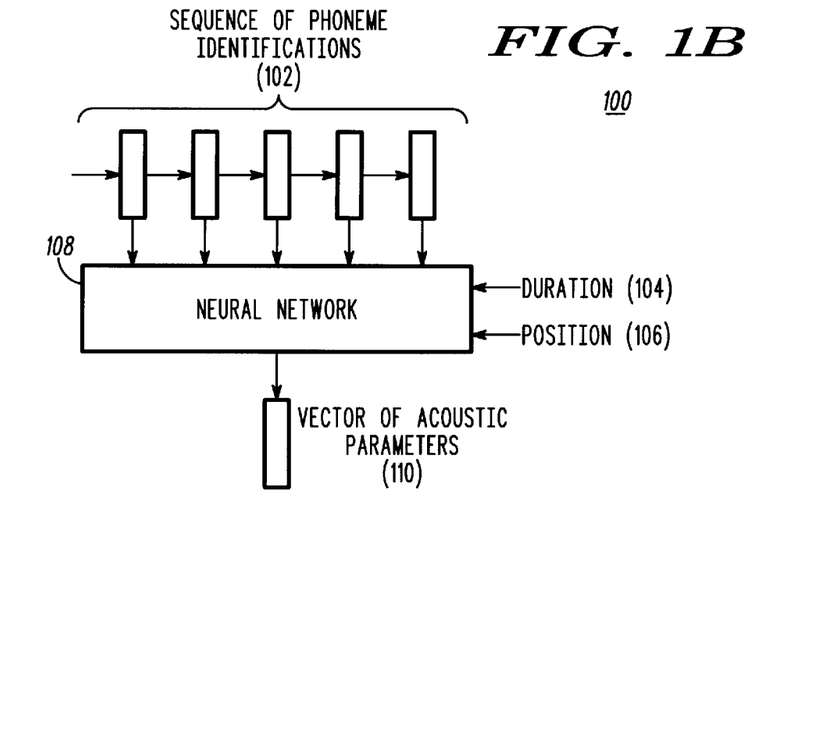
FIG. 1b is a block diagram of a neural network that computes acoustic parameters.

FIG. 1b illustrates a block diagram of an apparatus 100 that includes a neural network 108 that determines acoustic parameters. The input provided to the network is a sequence of representations of phonemes 102, one of which is the current phoneme. (The current phoneme is the one containing the current frame (i.e., the frame for which the acoustic parameters are being determined). Speech is divided into intervals of fixed duration, called frames.) The other phonemes are the phonemes associated with the adjacent segments (i.e., the segments that occur in sequence with the current segment). The neural network has additional inputs that determine the duration 104 of the current segment and the position 106 of the current frame in the current segment. The output of the neural network 108 is a vector of acoustic parameters 110 describing the current frame.

Figure 2:
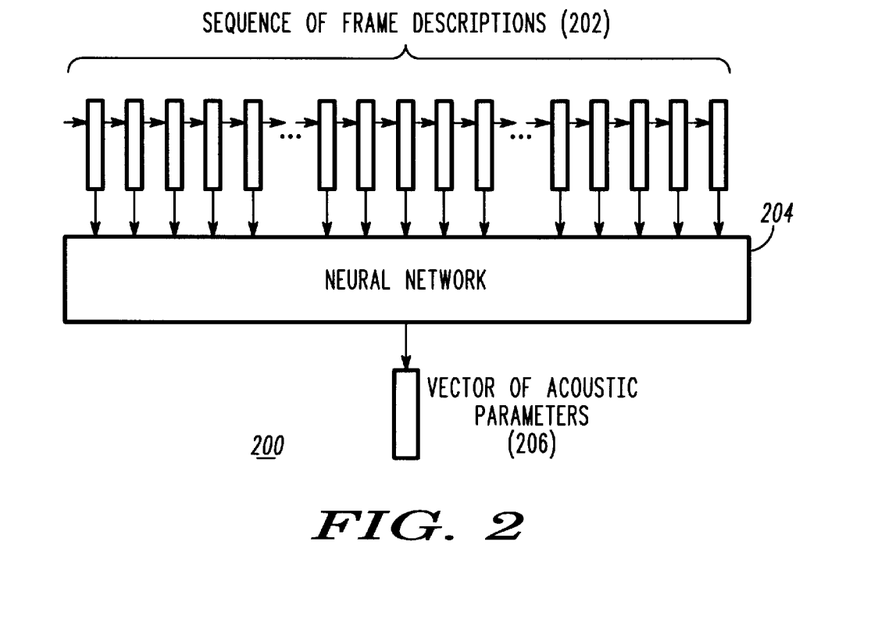
FIG. 2 is a block diagram of another neural network that computes acoustic parameters.

Referring to FIG. 2, a block diagram of another neural network 200 that determines acoustic parameters is illustrated. The input to the neural network is a sequence of frame descriptions 202, one of which describes the current frame (i.e., the frame for which an acoustic description is being determined). The other frame descriptions describe the adjacent frames (i.e., the frames that occur in sequence with the current frame). Each frame description includes a phoneme identification, identifying the phoneme associated with the segment containing the frame. The output of the neural network 204 is a vector of acoustic parameters 206 describing the current frame.

Figure 3:
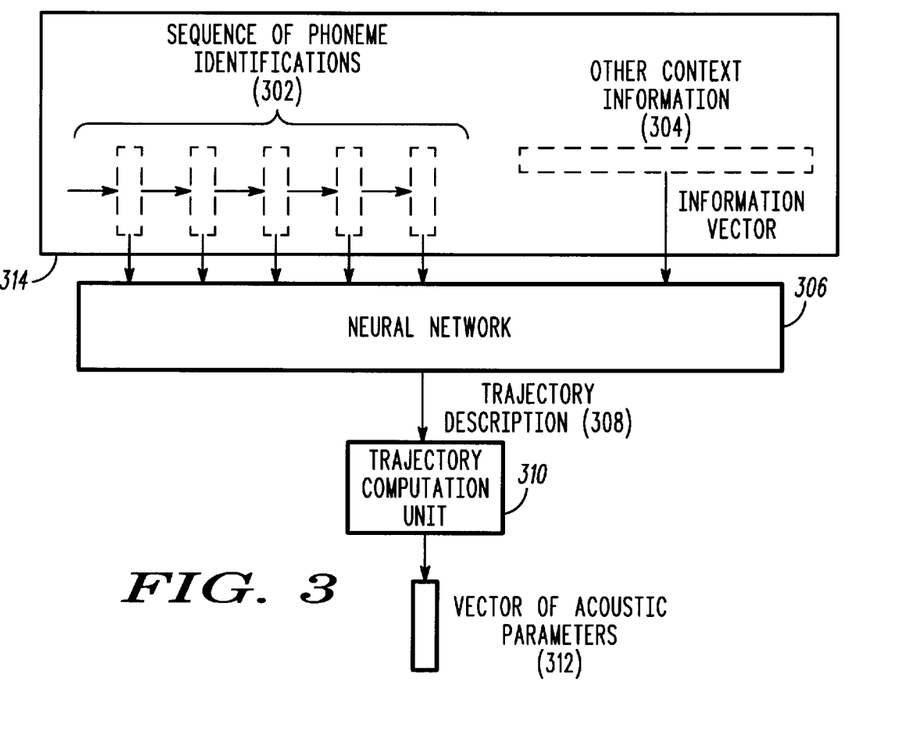
FIG. 3 is a block diagram of an apparatus in accordance with the present invention.

FIG. 3 illustrates a block diagram of an apparatus 300 including a neural network 306 and postprocessor in accordance with the present invention. The input to the neural network 306 is an information vector 314 describing a segment for which a trajectory of acoustic parameters is being computed. Typically, this information vector includes a sequence of phoneme identifications 302, one of which identifies the phoneme associated with the current segment (i.e., the segment for which a trajectory description is being computed). The other phoneme identifications identify adjacent segments (i.e., segments occurring in sequence with the current segment). Other context information 304 (i.e., syntax, stress, and intonation information) may also be included in the information vector. The output of the neural network 306 is a trajectory description 308, which is provided to a trajectory computation unit 310, which produces a sequence of vectors of acoustic parameters 312, one vector for each frame in the current segment.

The context information 304 typically includes at least one of: (1) articulatory features associated with each phone in the sequence of phones; (2) locations of syllable, word and other syntactic and intonational boundaries; (3) syllable strength information; (4) descriptive information of a word type; and (5) rule firing information (i.e., information that causes a rule to operate).

The trajectory description 308 typically includes a representation of the duration of the segment. Alternatively, this information may be precomputed using other techniques known in the art, in which case, said duration may be included in the information vector 314 input to the neural network.

Training data for the pretrained network is generated by (1) recording natural speech; (2) partitioning the speech data into identified phones; (3) marking any other syntactical intonational and stress information used in the apparatus or device; (4) encoding the speech using a vocoder; (5) computing a trajectory that best fits the vocoder parameters, using for example, conventional techniques; and (6) processing into informational vectors and target output for the neural network. The device of the present invention may be implemented, for example, in a text-to-speech synthesizer or any text-to-speech system.

Figure 4:
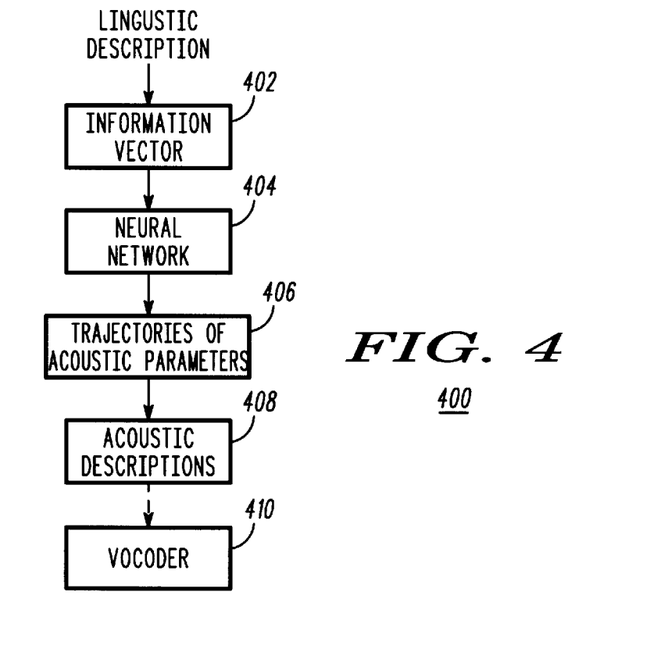
FIG. 4 is a flow chart of one embodiment of a method to generate a series of acoustic descriptions in accordance with the present invention.

FIG. 4 illustrates a flow chart 400 of one embodiment of the steps of a method in accordance with the present invention. The method provides for generating a series of acoustic descriptions in a text-to-speech system based upon a linguistic description of text. The method includes the steps of generating an information vector for each segment description in the linguistic description at block 402, wherein the information vector includes a description of a sequence of segments surrounding the described segment. At block 404, the information vector is provided as input to a pretrained neural network, and the neural network generates a representation of a trajectory in a space of acoustic parameters at block 408, said trajectory being associated with the described segment. At block 408, the series of acoustic descriptions is generated by computing points on the trajectory at identified instants.

The linguistic description of speech includes a sequence of phone identifications and each segment of speech is the portion of speech in which one of the identified phones is expressed. Each segment description in this case includes at least the phone identification for the phone being expressed.

The information vector may contain descriptive information including at least one of: (1) articulatory features associated with each phone in the sequence of phones; (2) locations of syllable, word and other syntactic and intonational boundaries; (3) syllable strength information; (4) descriptive information of a word type; and (5) rule firing information.

The description of the trajectory typically includes the duration of each segment. Alternatively, the duration may be precomputed, in which case said duration may be included in the information vector provided as input to the neural network.

The training data for the pretrained network is generated by recording natural speech, partitioning the speech data into identified phones, marking any other syntactical intonational and stress information used in the device, encoding the speech using a vocoder, computing a trajectory that best fits the vocoder parameters, using for example, conventional techniques, and processing into informational vectors and target output for the neural network.

Figure 5:
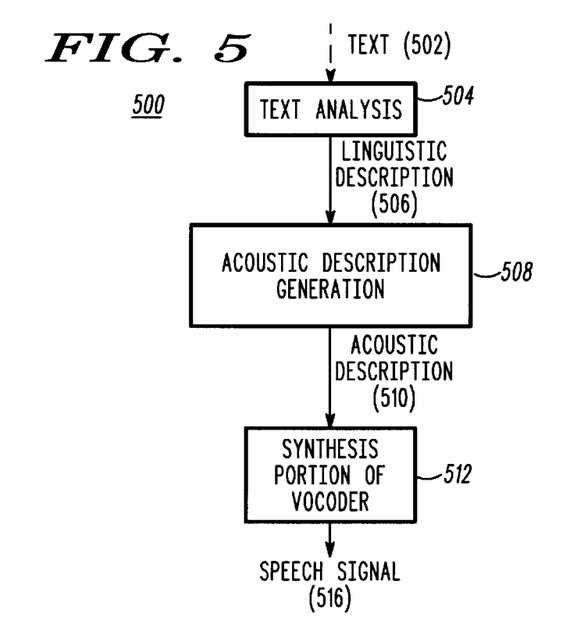
FIG. 5 illustrates a block diagram of a text-to-speech synthesizer in accordance with the present invention.

FIG. 5 illustrates an exemplary block diagram of a text-to-speech synthesizer 500 in accordance with the present invention. Input text 502 is analyzed at block 504 to produce linguistic description 506. At block 508, the synthesizer generates acoustic descriptions 510 of frames of speech. The acoustic descriptions 510 can be generated by the steps of FIG. 6, as further described below. These acoustic descriptions are provided to a vocoder 512, as is known in the art, and used to generate a speech signal 516.

Figure 6:
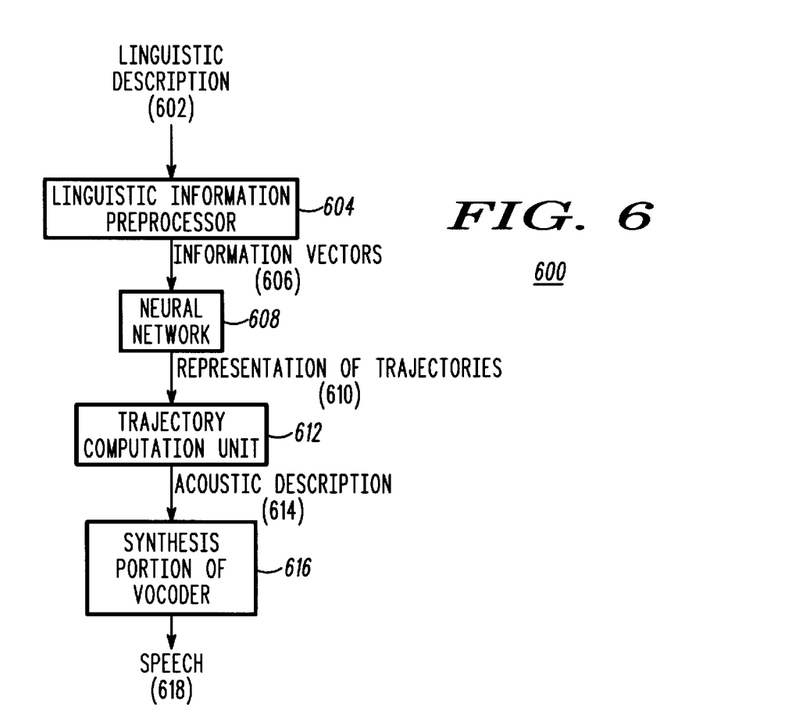
FIG. 6 illustrates a block diagram of the steps to convert a linguistic representation into speech in accordance with the present invention.

FIG. 6 illustrates a block diagram of an apparatus in accordance with the present invention to generate speech using a linguistic description or representation 602. A linguistic information preprocessor 604 converts the linguistic description into a series of information vectors 606. These information vectors are provided to a neural network 608, which computes a series of representations of trajectories 610. These representations of trajectories are provided to a trajectory computation unit 614, which computes a series of acoustic descriptions of speech 614, these acoustic descriptions being points on the trajectories. These acoustic descriptions may then be provided to the synthesis portion of a vocoder 616 in order to generate speech 618.

Figure 7:
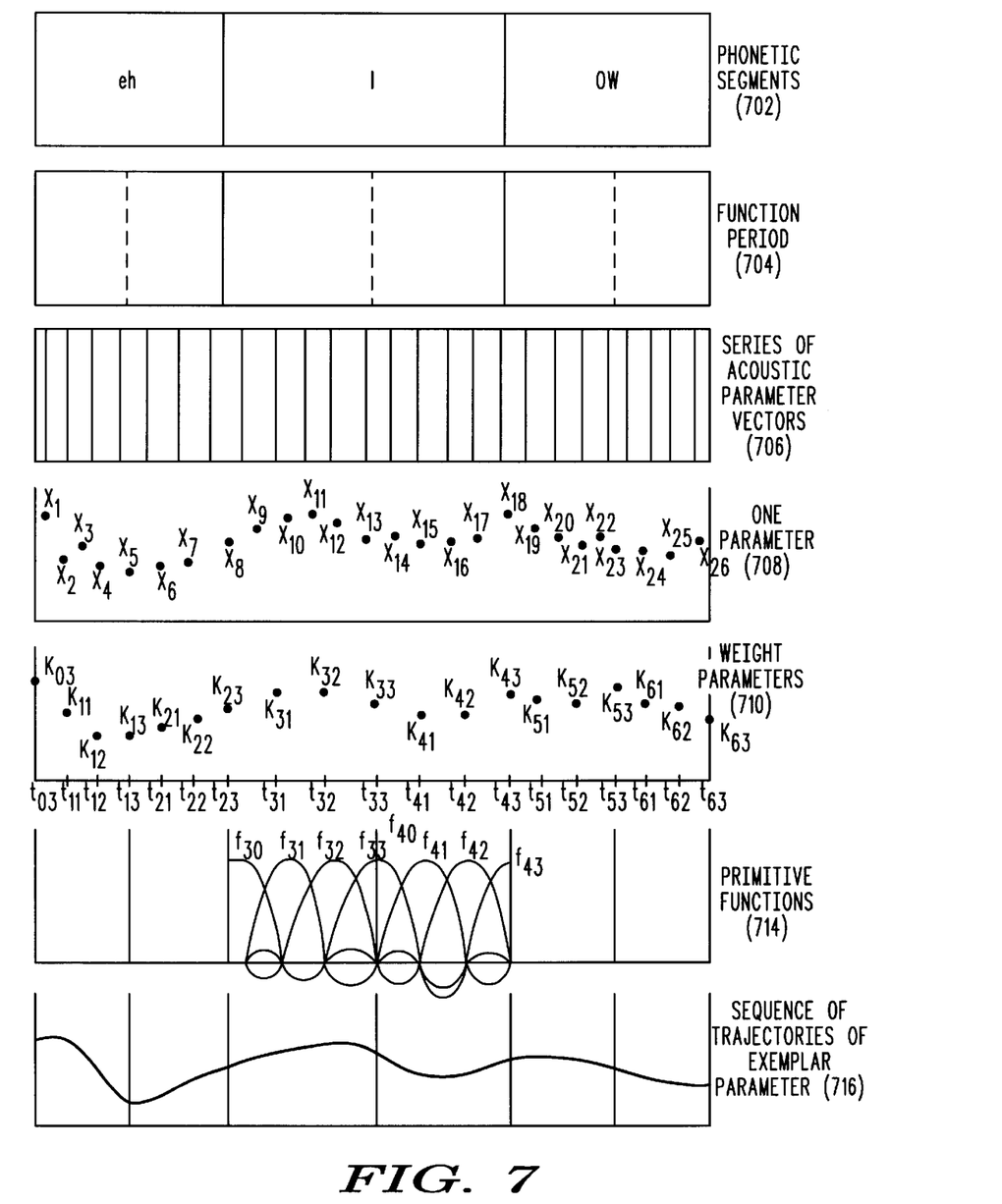
FIG. 7 illustrates the generation of a representation of a trajectory of an acoustic parameter in accordance with the present invention.

FIG. 7 illustrates the computation of trajectories for neural network training in the preferred embodiment. Speech is divided into a series of phonetic segments 702 associated with phones, each segment being divided into two-function periods 704. Speech is also represented as a series of acoustic parameter vectors 706. The trajectory through an acoustic parameter space is represented by separately representing the variation in each parameter in the acoustic parameter vector. Each parameter 708 is represented as a cubic function in each function period, with the functions being defined so that the value of the parameter is continuous at the function period boundaries. This is accomplished by representing the function as the sum of a series of weight parameters 710, multiplied by primitive functions 712, which are cubic functions that have a value of one at one predefined time in a function period and zero at three other times in that function period. For example, $f_{31}$ is defined as:

$$(t-t_{23})(t-t_{32})(t-t_{33}) / (t_{31}-t_{23})(t_{31}-t_{32})(t_{31}-t_{33})$$

which is one at time $t_{31}$ and zero at times $t_{23}$, $t_{32}$, and $t_{33}$. The cubic function representing the parameter 708 in the function period from $t_{23}$ to $t_{33}$ would be represented by the cubic function: $k_{23}*f_{30}+k_{31}*f_{31}+k_{32}*f_{32}+k_{33}*f_{23}$. The weight parameters, therefore, are the values of the cubic functions at the specified times. Using a single weight parameter at the function period boundaries, to specify both the cubic function for the period preceding the boundary and the function for the period following the boundary, guarantees that the concatenated functions will be continuous at the boundary. An error value between each sample of the actual value of the exemplar parameter 708, and the value from the sequence of trajectories, is computed by taking the difference between the actual value and the sum of the products of the weights associated with the function group that the sample is in and the corresponding primitive functions. Since this error measure is linear in the weights specified, the weight parameters that minimize the mean square value of the error measure across a sequence of acoustic parameters can be computed by techniques known in the art. In the preferred embodiment, the weight parameters for the trajectories make up the representations of the trajectories. For any given phonetic segment, the neural network is not trained to compute the value of the trajectory at the start of the segment; the value at the end of the preceding segment is stored and used instead.

The steps of the method may be stored in a memory unit of a computer or alternatively, embodied in a tangible medium of/for a Digital Signal Processor, DSP, an Application Specific Integrated Circuit, ASIC, or a gate array.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A method for generating a series of acoustic descriptions in a text-to-speech system based upon a linguistic description of text comprising the steps of:

a) generating an information vector for each segment description in the linguistic description, wherein the information vector includes a description of a sequence of segments surrounding a described segment;

b) using a neural network to generate a representation of a trajectory of acoustic parameters, said trajectory being associated with the described segment; and c) generating the series of acoustic descriptions by computing points on the trajectory at identified instants, for each of a set of time periods making up the segment, the trajectory consists of each acoustic parameter in the space of acoustic parameters being equal to a polynomial function of time, wherein the polynomial functions are cubic functions, wherein the number of time periods making up the segment is two.

2. The method of claim 1 wherein the speech is described as a sequence of phone identifications and the segments for which duration is being generated are segments of speech expressing predetermined phones in the sequence of phone identifications, wherein segment descriptions include the phone identifications.

3. The method of claim 2 wherein the information vector also includes descriptive information for a context associated with the described segment, said descriptive information including at least one of (a) articulatory features associated with each phone in the sequence of phones; (b) locations of syllable, word and other syntactic and intonational boundaries; (c) syllable strength information; (d) descriptive information of a word type; and (e) rule firing information.

4. The method of claim 1 wherein the representation of the trajectory consists of the value of each acoustic parameter in the space of acoustic parameters at the beginning of each time period, one-third of the way through each time period, two-thirds of the way through each time period, and at the end of each time period.

5. The method of claim 4 wherein the neural network output does not include a value for each parameter at the beginning of each time period, the value of the parameter at the end of the previous time period being used instead.

6. The method of claim 1 wherein the neural network is a pretrained feedforward neural network.

7. The method of claim 6 wherein the pretrained neural network has been trained using back-propagation of errors.

8. The method of claim 7 wherein training data for the pretrained network has been generated by recording natural speech, partitioning the speech data into segments associated with identified phones, marking any other syntactical intonational and stress information used in the method, using a vocoder to generate a series acoustic parameters corresponding to the speech, using optimization techniques to determine a representation of a trajectory that approximates the actual series of acoustic parameters and processing into informational vectors and target output for the neural network.

9. The method of claim 1 wherein the steps of the method are stored in a memory unit of a computer.

10. The method of claim 1 wherein the steps of the method are implemented by a Digital Signal Processor.

11. The method of claim 1 wherein the steps of the method are embodied in a tangible medium of/for an Application Specific Integrated Circuit, ASIC.

12. The method of claim 1 wherein the steps of the method are embodied in a tangible medium of a gate array.

13. The method of claim 1 further including the step of providing the series of descriptions to a vocoder to generate speech.

14. The method of claim 1 wherein the representation of the trajectory includes a representation of a duration for the segment.

15. The method of claim 1 wherein the duration of the segment is predetermined and included as part of the information vector provided to the neural network.

16. A device for generating a series of acoustic descriptions in a text-to-speech system based upon a linguistic description of text comprising:
   a) a linguistic information preprocessor, operably coupled to receive the linguistic, to generate an information vector for each segment description in the linguistic description, wherein the information vector includes a description of a sequence of segments surrounding a described segment;
   b) a neural network, operably coupled to the linguistic information processor, to generating a representation of a trajectory in a space of acoustic parameters, said trajectory being associated with the described segment; and
   c) a trajectory computation unit, operably coupled to the neural network, to generate the series of acoustic descriptions by computing points on the trajectory at identified instants, for each of a set of time periods making up the segment, the trajectory consists of each acoustic parameter in the space of acoustic parameters being equal to a polynomial function of time, wherein the polynomial functions are cubic functions, wherein the number of time periods making up the segment is two.

17. The device of claim 16 wherein the speech is described as a sequence of phone identifications and the segments for which duration is being generated are segments of speech expressing predetermined phones in the sequence of phone identifications, wherein segment descriptions include the phone identifications.

18. The device of claim 17 wherein the information vector also includes descriptive information for a context associated with the described segment, said descriptive information including at least one of: (a) articulatory features associated with each phone in the sequence of phones; (b) locations of syllable, word and other syntactic and intonational boundaries; (c) syllable strength information; (d) descriptive information of a word type; and (e) rule firing information.

19. The device of claim 16 wherein the representation of the trajectory consists of the value of each acoustic parameter in the space of acoustic parameters at the beginning of each time period, one-third of the way through each time period, two-thirds of the way through each time period, and at the end of each time period.

20. The device of claim 19 wherein the neural network output does not include a value for each parameter at the beginning of each time period, the value of the parameter at the end of the previous time period being used instead.

21. The device of claim 16 wherein the neural network is a pretrained feedforward neural network.

22. The device of claim 21 wherein the pretrained neural network has been trained using back-propagation of errors.

23. The device of claim 22 wherein training data for the pretrained network has been generated by recording natural speech, partitioning the speech data into segments associated with identified phones, marking any other syntactical intonational and stress information used in the method, using a vocoder to generate a series acoustic parameters corresponding to the speech, using optimization techniques to determine a representation of a trajectory that approximates the actual series of acoustic parameters and processing into informational vectors and target output for the neural network.

24. The device of claim 16 further including a vocoder, operably coupled to the trajectory computation unit, for generating speech.

25. The device of claim 16 wherein the representation of the trajectory includes a representation of a duration for the segment.

26. The device of claim 16 wherein the duration of the segment is predetermined and included as part of the information vector provided to the neural network.

27. A text-to-speech synthesizer to generate a series of acoustic descriptions in a text-to-speech system based upon a linguistic description of text comprising:
   a) a linguistic information preprocessor, operably coupled to receive the linguistic description, to generate an information vector for each segment description in the linguistic description, wherein the information vector includes a description of a sequence of segments surrounding a described segment;
   b) a neural network, operably coupled to the linguistic information processor, to generate a representation of a trajectory in a space of acoustic parameters, said trajectory being associated with the described segment; and c) a trajectory computation unit, operably coupled to the neural network, to generate the series of descriptions by computing points on the trajectory at identified instants, for each of a set of time periods making up the segment, the trajectory consists of each acoustic parameter in the space of acoustic parameters being equal to a polynomial function of time, wherein the polynomial functions are cubic functions, wherein the number of time periods making up the segment is two.

* * * * *